United States Patent [19]

Aldenhoven

[11] Patent Number: 4,649,532

[45] Date of Patent: Mar. 10, 1987

[54] DISC-RECORD PLAYER COMPRISING A PRESSURE MEMBER FOR PRESSING A RECORD DISC AGAINST THE TURNTABLE

[75] Inventor: Ghislanus M. A. M. Aldenhoven, Eindhoven, Netherlands

[73] Assignee: U.S. Philips Corporation, New York, N.Y.

[21] Appl. No.: 719,949

[22] Filed: Apr. 4, 1985

[30] Foreign Application Priority Data

Apr. 20, 1984 [NL] Netherlands .......................... 8401304

[51] Int. Cl.$^4$ .............................................. G11B 25/04
[52] U.S. Cl. ...................................................... 369/270
[58] Field of Search ............... 369/270, 271, 290, 292; 360/97, 133; 242/68.3

[56] References Cited

U.S. PATENT DOCUMENTS

| 2,833,488 | 5/1958 | Kerber | 242/68.3 |
| 3,083,927 | 4/1963 | Prosin | 242/68.3 |
| 3,817,469 | 6/1974 | Moscatti et al. | 242/68.3 |

FOREIGN PATENT DOCUMENTS

| 2078456 | 5/1971 | France | 242/68.3 |
| 194181 | 11/1983 | Japan | 369/270 |

*Primary Examiner*—Steven L. Stephan
*Attorney, Agent, or Firm*—F. Brice Faller

[57] ABSTRACT

A disc-record player comprises a pressure member for pressing a record disc (5) against a turntable (1) which carries a mandrel at the upper side, the mandrel being coaxial with the turntable and being engageable with the center hole of the record disc (5). The pressure member comprises spring means formed by turns (12a) of a toroidal coil compression spring (12) which is accommodated in a annular space (11) in the mandrel, which space is open at the circumference of the mandrel. The turns are clear of the mandrel at the side facing the turntable axis (1a). The spring turns (12a) are movable under spring force radially relative to the turntable axis (1a); they project from the circumference of the mandrel and press the disc against the turntable.

7 Claims, 3 Drawing Figures

DISC-RECORD PLAYER COMPRISING A PRESSURE MEMBER FOR PRESSING A RECORD DISC AGAINST THE TURNTABLE

BACKGROUND OF THE INVENTION

The invention relates to a disc-record player comprising a turntable and a pressure member for pressing a record disc against the turntable, the turntable carrying on its upper side a mandrel which is coaxial with the turntable and is engageable with the centre hole of the disc, and the pressure member comprising spring means which are accommodated in the mandril and project from the circumference thereof, which are movable under spring force in radially inward and outward directions relative to the turntable axis and which keep the disc pressed against the turntable.

A disc-record player of this type is disclosed in French Patent Specification No. 2,078,456. In such a disc-record player the pressure member is accommodated in the mandrel which is situated above the turntable, so that for urging the disc against the turntable it is not necessary to move a separate disc-pressure means downwardly from a position above the turntable and the height of the disc-record player above the turntable can be limited. In the known disc-record player the spring means comprise three elastically supported balls arranged at the circumference of the mandrel. As a result of this, the record disc is urged against the turntable at a few points only. Moreover, the three balls may not always exert equal pressures on the disc. As a result of this, the pressure exerted on the disc by the pressure member of the known disc-record player may be distributed irregularly, so that in operation the disc is not situated in the correct position relative to the turntable and/or slip occurs between the disc and the turntable.

SUMMARY OF THE INVENTION

The invention aims at providing a disc-record player of the type defined in the opening paragraph with a pressure member which acts against the record disc at a large number of points, the pressure being distributed uniformly among these points.

According to the invention the spring means comprise turns of a coil compression spring which is accommodated in an annular space in the mandrel, which space is open at the circumference of the mandrel, which turns have a symmetrical shape relative to a plane which extends in a radial direction relative to the turntable axis and are clear of the mandrel at the sides facing the turntable axis. This results in a pressure member which is capable of exerting a uniformly distributed pressure on the disc at a large number of pressure points defined by the turns of the spring in order to ensure that the disc is positioned, correctly on the turntable in operation. Loading a record disc onto the turntable is not impeded by this pressure member because the turns of the coil compression spring can be urged radially inwards towards the axis of the turntable. Because of the small height above the turntable the pressure member is suitable for use in disc-record players in which a disc is brought into a position above the turntable upon insertion and is subsequently lowered onto the turntable. An example of this is a disc-record player which is intended for playing optically readable audio discs of the "compact disc" type and which is installed behind the dashboard of a car.

It is to be noted that U.S. Pat. No. 3,817,469 describes a pressure member having a toroidal coil spring whose turns draw the hub of a tape reel against a reel disc of a winding member. As the spring is a tension spring whose turns are inclined at angles of approximately 40° relative to a plane through the axis of rotation, the turns being drawn against the mandril of the winding member, the turns can be pressed radially inwards over a small distance only and subsequently spring back when the reel hub is slid onto the spring. As a result of this the reel hub is not firmly kept in position. Therefore, the reel hub is clamped in position by means of a separate clamping device.

A preferred embodiment of the invention is characterized in that the mandrel comprises a cap which is situated above and spaced from the turntable and its lower side is connected to a cylindrical sleeve which extends from the cap up to the turntable, the annular space being bounded by surfaces of the cap, the sleeve and the turntable. This provides an easy-to-assemble turntable-and-mandrel combination in which the coil spring can be mounted in an effective manner. Inside the annular space the turns can move effectively in a radially inward direction when the disc is moved over the mandrel and then back in an outward direction after the disc has passed below the maximum diameter of the spring.

In connection with the foregoing another embodiment of the invention is characterized in that the cap comprises a substantially frusto-conical peripheral portion which retains the turns of the coil spring in said annular space at the side facing the turntable. The substantially frusto-conical peripheral portion of the cap can perform a pre-centring function when the record disc is placed on the mandrel as well as ensuring that the spring turns cannot move out of the annular space in a radial direction.

A further embodiment of the invention is characterized in that inside the turns of the coil spring there is arranged a split ring, the ends of which are separated by a gap. The split ring inside the turns of the coil spring limits the maximum diameter of the coil spring in the annular space. The use of the split ring ensures that the coil spring is retained effectively in the annular space and provides considerable freedom in the design of the cross-sectional profile of the peripheral portion of the cap and the possibility for the spring turns to be moved relatively far in a radially outward direction. This freedom in the choice of the profile of the peripheral portion of the cap and the freedom of movement of the spring turns ensure that the spring turns act against the inner side of the peripheral portion at an optimum location for record discs of varying thickness and thus always exert a substantially constant pressure on the record disc. The gap between the ends of the ring enables the turns of the coil spring to be slid onto the ring. Preferably, the ring is made of a sufficiently strong material to prevent it from being forced further open by the coil spring.

DETAILED DESCRIPTION OF THE PREFERRED EMBODIMENTS

Figure 1:
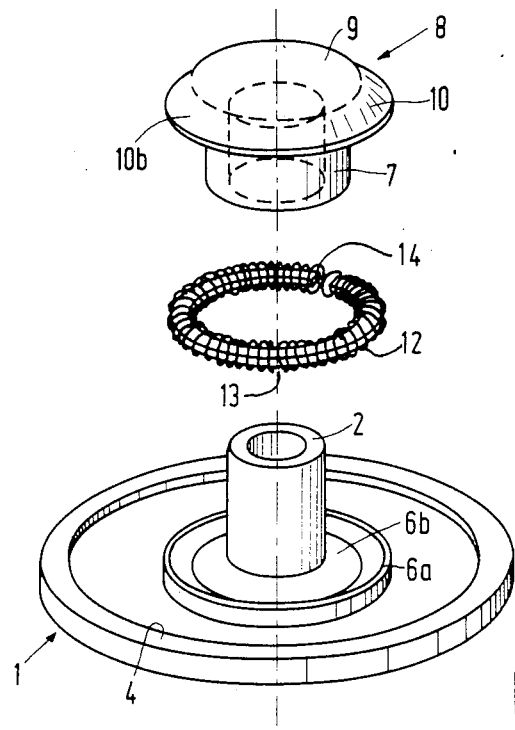
FIG. 1 is an exploded perspective view of the turntable, the pressure member and the mandrel of one embodiment of the invention.
Figure 2:
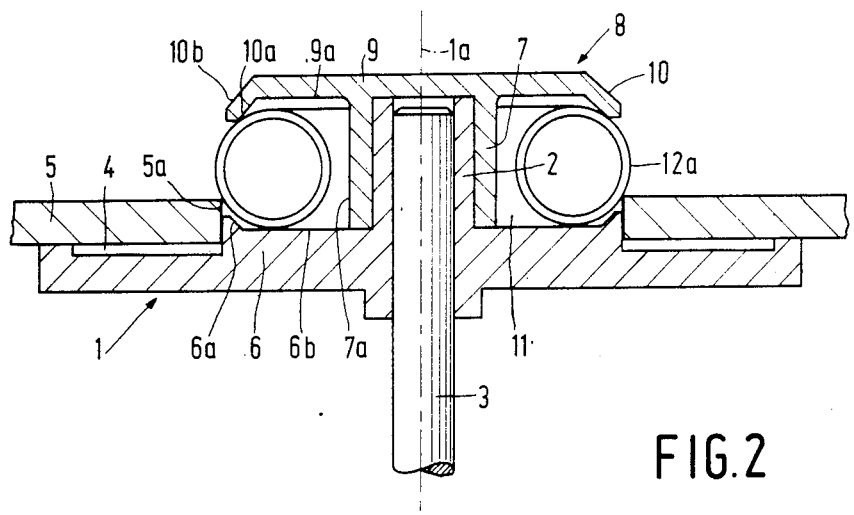
FIG. 2 is a section view of the turntable, pressure member and mandrel shown in FIG. 1, showing a record disc pressed against the turntable by the pressure member.

The drawings show a turntable 1 which is rotatable about an axis 1a. The turntable axis 1a forms the axis of rotation of a hub 2 which is integral with the turntable 1 and which is clamped on a spindle 3. At its circumference the turntable 1 has a raised rim 4 for supporting a record disc 5, whigh rim may be coated with a high-friction material. The disc 5, which in the present example is of the compact-disc type and carries optically readable audio information, has a centre hole whose boundary wall 5a fits around a raised central portion 6 of the turntable, which central portion is provided with a raised rim 6a for this purpose. The lower end of a cylindrical sleeve 7 bears on the upper surface 6b of the central portion 6, which sleeve is slid onto the hub 2 and is fixed relative to the hub in a manner not shown to rotate with it. The sleeve 7 extends from the central portion 6 up to a cap 8 which is integral with the sleeve 7. The cap 8 comprises a flat, disc-shaped main portion 9 and a frusto-conical peripheral portion 10 whose diameter increases in the direction towards the turntable 1. The cap 8 and the raised rim 6a together constitute a mandrel onto which the disc 5 can be slid. When the disc 5 is being placed on the turntable, the outer surface 10b of the frusto-conical peripheral portion 10 of the cap 8 has a centring action which enables the disc to be pre-centred correctly on the turntable 1 by means of the boundary wall 5a of the hole in the disc.

The outer surface 7a of the sleeve 7, the inner surface of the rim 6a and the upper surface 6b of the central portion 6 of the turntable, and the lower surface 9a and inner surface 10a of the main and peripheral portions 9 and 10 respectively of the cap 8 bound an annular space 11 in the mandrel which acccommodates a toroidal coil spring 12. Each spring turn 12a is substantially as planar with the turntable axis 1a. As a result of this shape and the relatively large number of turns, each turn 12a is substantially perpendicular to the surface 6b. Since the spring is loaded in compression, each turn 12a is pressed against the rim 6a and the wall 10a, the turn being spaced from the outer surface 7a. The rim 6a has a frusto conical inner surface whose diameter increases in the direction away from the turntable, and the resulting convergence of this surface and the inner surface 10a of the peripheral portion 10 of the cap 8 in the radially outward direction serves to ensure that the turns 12a of the spring are captured in the space 11, which is open at the circumference of the mandril.

Figure 3:
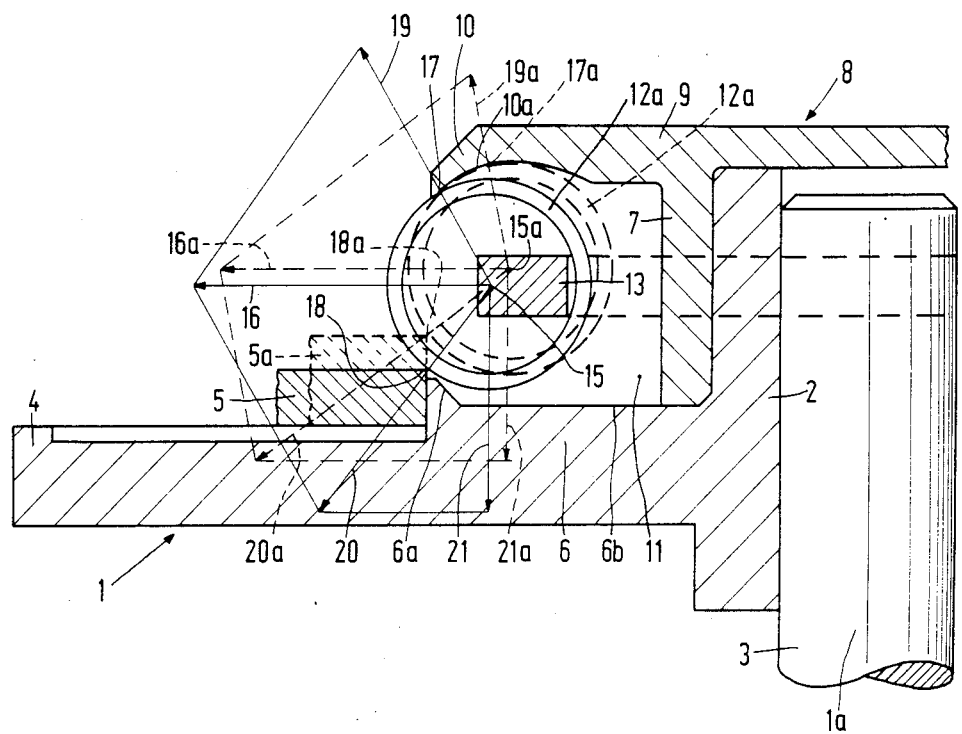
FIG. 3 is, a partial section view of a second embodiment of the invention, showing the pressure member in two positions corresponding to discs of a minimum and maximum thickness, respectively.

In an alternative embodiment a split ring 13 is arranged inside the turns 12a of the spring 12 (see FIG. 3). The ends of the ring, as shown in FIG. 1, being separated by a gap 14. The presence of the gap 14 enables the turns 12a to be slid onto the ring 13, which facilitates the mounting of the spring on the ring. When the spring has been mounted the gap 14 is bridged by a number of the turns 12a so that the turns of the spring are equi-spaced around the circumference of the hub 2.

After a disc has been pre-centred on the outer surface 10b, the disc is slid down over the outer circumference of the spring 12. As permitted by the spacing relative to the outer wall 7a, the turns 12a of the spring are pressed inwards towards the turntable axis 1a by the disc 5 against their resilience until the disc has passed below the central plane of the spring, which is the plane containing the centres of the turns 12a and where the spring has its maximum diameter. The turns then resile in the outward direction and exert a force on the boundary wall 5a of the centre hole of the disc 5 to press the disc against the rim 4 of the turntable. During rotation of the turntable the disc rotates with the turntable owing to the friction between the disc and the supporting rim 4.

In practice, the thickness of record discs of the above-mentioned compact-disc type is subject to certain tolerances. Despite these tolerances the pressure exerted on the disc by the turns 12a of the spring 12 should remain substantially constant for various disc thicknesses. For this purpose it is important that the inner surface 10a of the peripheral portion 10 of the cap 8 does not significantly obstruct the radially outward movement of the turns of the spring. In a manner as shown in FIG. 3 for the second embodiment, the spring 12 can still exert the desired pressure in the case of a record disc of minimum thickness as a result of the outward movement of the spring turns 12a. In this respect the substantially upright position of each turn 12a is important. In FIG. 3 this situation is represented by the uninterrupted lines. The centre of a spring turn 12a is situated at the point bearing the reference numeral 15. The spring force of this turn 12a is represented by the force vector 16, which vector is unambiguously defined both in respect of its direction (radially of the axis 1a and perpendicular thereto) and in respect of its magnitude (in conformity with the spring characteristics of the spring 12). The direction of the reactive force of the turn 12a on the peripheral portion 10 of the cap 8 is determined by the line between the centre 15 of the turn and the point 17 at which the turn touches the portion 10. Similarly, the direction of the force exerted by the turn 12a on the boundary wall 5a of the centre hole of the record disc 5 is determined by the line between the point 15 and the point 18 at which the turn touches the wall 5a. The force diagram in FIG. 3 shows how these lines yield the force vectors 19 and 20. The terminus of the vector 20 determines the vector 21 which extends parallel to the axis 1a and which represents the axial pressure exerted on the record disc by the turn 12a.

The broken lines in FIG. 3 represent the situation in the case of a record disc of maximum thickness. In this situation it is not unlikely that the magnitude of the pressure (vector 21) deviates strongly due to the inward movement of the spring turns 12a. This can be precluded by a correct choice of the cross-sectional profile of the peripheral portion 10 of the cap 8, in particular the profile of the inner surface 10a of portion 10. As a result of the larger thickness of the record disc the centre 15a of a spring turn is situated more inwardly and slightly higher relative to the turntable 1 than the centre 15 of the spring turn in the case of a dics of minimum thickness. The force vector 16a is unambiguously defined in the same way as the vector 16. There is a difference in the point 17a at which the spring turn 12a touches the inner surface 10a of the peripheral portion 10 of the cap 8; the location of this point 11a relative to the axis 1a depends on the profile of the surface 10. A suitable location of the point 17a is obtained by giving the surface 10a a concave shape such that the point 17a is displaced as far as possible in a radially inward direction. In this way the point 18a at which the spring turn 12a touches the wall 5a of the centre hole of the record disc, the vectors 19a and 20a provide the pressure as represented by the vector 21a. Thus, the pressure exerted on a record disc can be maintained constant within reasonable limits both in the case of a disc of minimum thickness and in the case of a disc of maximum thickness.

The force diagrams shown in FIG. 3 illustrate that the pressure does not vary by more than approximately 20% with record discs of minimum and maximum thickness. This ensures a satisfactory operation of the pressure member for varying thicknesses of the discs.

The pressure member comprising the coil spring 12 ensures that the record disc is pressed onto the supporting rim 4 of the turntable in a uniform manner at a very large number of pressure points defined by the turns 12a of the spring. This has the advantage that with a minimum number of parts the height of the pressure member above the turntable 1 can be minimized. As a result of this, this construction is particularly suitable for disc-record players which are accommodated in a compact housing, such as a disc-record player intended for use in a motor car.

What is claimed is:

1. A disc player comprising
   a turntable for receiving a disc thereagainst, said turntable having an axis of rotation;
   a generally cylindrical mandrel projecting above said turntable coaxially with said axis, said mandrel being sized substantially the same as a central hole in said disc, said mandrel having therein an annular space which is open at the circumference of the mandrel;
   a toroidal coil spring in said annular space, said spring being loaded in compression and having turns which are each substantially coplanar with said turntable axis, the outer circumference of said spring extending beyond the circumference of said mandrel where said annular space is open, the inner circumference of said spring being clear of the mandrel, said spring having a central plane parallel to said turntable and spaced therefrom by a distance sufficient to ensure pressing said disc against said turntable, said distance being greater than the maximum expected disc thickness.

2. The disc player of claim 1 wherein said spring is captured by said mandrel to maintain compressive loading.

3. The disc player of claim 1 wherein inside the turns of said coil there is a split ring.

4. The disc player of claim 1 wherein said annular space is sized to permit axial movement of said toroidal coil spring relative to the turntable when a disc is pressed thereagainst.

5. The disc player of claim 4 wherein said annular space is bounded by a peripheral inner surface opposite said turntable and facing said axis, said inner surface converging from where said annular space is open toward said axis.

6. The disc player of claim 5 wherein said peripheral inner surface is a frusto-conical surface.

7. The disc player of claim 5 wherein said peripheral inner surface is a concave surface.

* * * * *